United States Patent
Hsu et al.

(10) Patent No.: US 9,087,031 B2
(45) Date of Patent: *Jul. 21, 2015

(54) METHOD AND PROGRAM FOR SELECTIVE SUSPENSION OF USB DEVICE

(71) Applicant: MEDIATEK INC., Hsin-Chu (TW)

(72) Inventors: Ying-Che Hsu, Hsinchu (TW);
Wen-Juin Huang, Hsinchu (TW);
Ang-Juei Tsai, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,306

(22) Filed: Oct. 11, 2013

(65) Prior Publication Data
US 2014/0040520 A1    Feb. 6, 2014

Related U.S. Application Data

(63) Continuation-in-part of application No. 12/945,724, filed on Nov. 12, 2010, now Pat. No. 8,589,954.

(51) Int. Cl.
*G06F 13/24* (2006.01)
*G06F 13/10* (2006.01)

(52) U.S. Cl.
CPC .............. *G06F 13/24* (2013.01); *G06F 13/102* (2013.01); *Y02B 60/1228* (2013.01)

(58) Field of Classification Search
None
See application file for complete search history.

(56) References Cited

U.S. PATENT DOCUMENTS

| | | | |
|---|---|---|---|
| 7,783,788 B1 * | 8/2010 | Quinn et al. | 710/8 |
| 7,793,279 B1 | 9/2010 | Le et al. | |
| 8,001,553 B2 * | 8/2011 | Li et al. | 719/324 |
| 2002/0069245 A1 * | 6/2002 | Kim | 709/203 |
| 2007/0030859 A1 | 2/2007 | Pope et al. | |
| 2007/0220530 A1 * | 9/2007 | Hsieh | 719/327 |
| 2008/0098410 A1 * | 4/2008 | Oshins et al. | 719/321 |
| 2008/0320501 A1 * | 12/2008 | Li et al. | 719/324 |
| 2009/0001160 A1 * | 1/2009 | Davis et al. | 235/380 |
| 2009/0288167 A1 | 11/2009 | Freericks et al. | |
| 2010/0162242 A1 | 6/2010 | Grouzdev | |

OTHER PUBLICATIONS

Ciliendo et al., "Linux Performance and Tuning Guidelines", ibm. conn/redbooks, IBM International Technical Support Organization, Jul. 2007, pp. 1-168.
Yamauchi et al., "Writing Solaris Device Drivers in Java", PLOS'06, Oct. 2006, pp. 1-6.

* cited by examiner

*Primary Examiner* — Tuan Dao
(74) *Attorney, Agent, or Firm* — Chen Yoshimura LLP

(57) ABSTRACT

A method provides device selective suspension feature when the operating system does not allow certain device drivers to perform device selective suspension. Two driver stacks are provided in the kernel space for the device. The first driver stack includes a virtual bus, a PDO (physical device object) created by the virtual bus, and a driver for the device (e.g. NDIS driver); the second stack includes a device driver stack (e.g. USB generic driver) and a function driver that performs device selective suspension by sending power IRPs to the device driver stack. By using a virtual bus and PDOs created by the virtual bus in the first driver stack, the driver above the PDO can be any one of many types of drivers (NDIS driver being one example). The virtual bus forwards IRPs from the first driver stack to the second driver stack.

8 Claims, 9 Drawing Sheets

METHOD AND PROGRAM FOR SELECTIVE SUSPENSION OF USB DEVICE

BACKGROUND OF THE INVENTION

1. Field of the Invention

The present invention relates to a method and related program for selective suspension of devices, and in particular, related to a dual-stack driver architecture for selective suspension of universal serial bus (USB) devices.

2. Description of the Related Art

Devices such as universal serial bus (USB) devices are increasingly popular in computer systems. As a result, computer software operating system (OS) programs typically include drivers for interfacing with the USB devices through the input/output (I/O) ports of the computer system.

Many widely used computer OS programs, such as the Windows™ NT developed by Microsoft, often have two main components, a user component for handling user applications and a kernel component for bridging the user applications and the actual data processing done at the hardware level. The kernel component typically manages the system's resources and communication between hardware and software components, and often provides a low-level abstraction layer for the system's resources (especially processors and I/O devices) that application software must control to perform their functions. The kernel component also makes these resources available to application processes through inter-process communication mechanisms and system calls. In this connection, the OS programs often segregates the virtual memory into a user space for user applications and a kernel space for running kernel, kernel extensions and most device drivers. Some of these device drivers include Network Driver Interface Specification (NDIS) miniport driver using the Windows Driver Model (WDM) or the Windows Driver Foundation (WDF) (also known as NDIS/WDM/WDF drivers).

Referring to FIG. 1, there is illustrated a conventional driver architecture, including a user space with applications 10, and a kernel space with NDIS miniport driver 20 and USB driver stack 40, for interfacing with hardware USB network device 50.

In this architecture, the WDM/WDF driver is in the same driver stack of the miniport driver. However, in some OS programs, such as Windows™ XP and Windows™ Vista, the NDIS miniport driver is not allowed to use USB selective suspend mechanism. This is because in such OS (e.g., Windows™ XP or Vista), only a power policy owner, i.e., the function driver, may issue a power I/O request packet (IRP) to suspend a USB network device. But in the driver architecture shown in FIG. 1, the NDIS miniport driver is also the function driver, yet the OS does not allow it to issue a power IRP. This is problematic as it is often desirable to selectively suspend one or more USB network devices to save host and the device power consumption while a network device is in disconnected state, yet the clashes of the OS restriction or limitation prevents the USB network devices to enter a suspend mode which reduces power consumption by both the host and the network device.

Moreover, after an USB network device enters suspended mode, some OS embodiments (e.g. Windows™ XP or Windows™ Vista) do not allow user applications access the device directly. Again this is problematic because it is also often desirable for a user application to directly access a suspended USB network device (to "wake" it up directly and use it), yet the OS restriction or limitation prevents the USB network devices be directly accessed by user applications while they are suspended and cannot be waken up by the user application directly.

Although NDIS miniport driver is discussed above as an example, these problems exist for other types of drivers as well.

Therefore, it is desirable to provide a driver architecture that allows selective suspension of an USB or I/O device to reduce power consumption by the host and the device, and also allows a suspended USB or I/O device be directly accessed by user applications.

SUMMARY OF THE INVENTION

The present invention is directed to a dual-stack driver architecture for USB or other I/0 device selective suspend.

An object of the present invention is to provide a dual-stack driver architecture that allows an USB device to enter suspend mode selectively despite OS restriction or limitation.

Another object of the present invention is to provide a dual-stack driver architecture that allows an USB device to be accessed by user applications directly despite OS restriction or limitation.

A further object of the present invention is to provide a dual-stack driver architecture that allows an I/O device to enter suspend mode and keep it active to network stack despite OS restriction or limitation in order to reduce host and device power consumption.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method for controlling a device coupled to a host computer, which includes: providing a first driver stack in a kernel space of an operating system (OS) of the host computer, wherein the first driver stack includes a virtual bus, a physical device object created by and coupled to the virtual bus, and a first device driver coupled to the physical device object, to interact with user applications in a user space of the OS; and providing a second driver stack in the kernel space of the OS, wherein the second driver stack includes a function driver and a second device driver for the device, to interact with the device, wherein the function driver is coupled to the first driver stack and the second device driver is coupled to the function driver, wherein the second driver stack forwards data from the virtual bus of the first driver stack to the device, and wherein the function driver issues a command to the second device driver to selectively suspend the device, and wherein the first driver stack and the second driver stack are distinct, and the first device driver and the function driver are distinct.

In another aspect, the present invention provides computer software program having a computer readable program code embedded in a computer usable non-transitory storage medium for controlling a host computer, the computer readable program code configured to cause the host computer to execute the above process.

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENTS

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
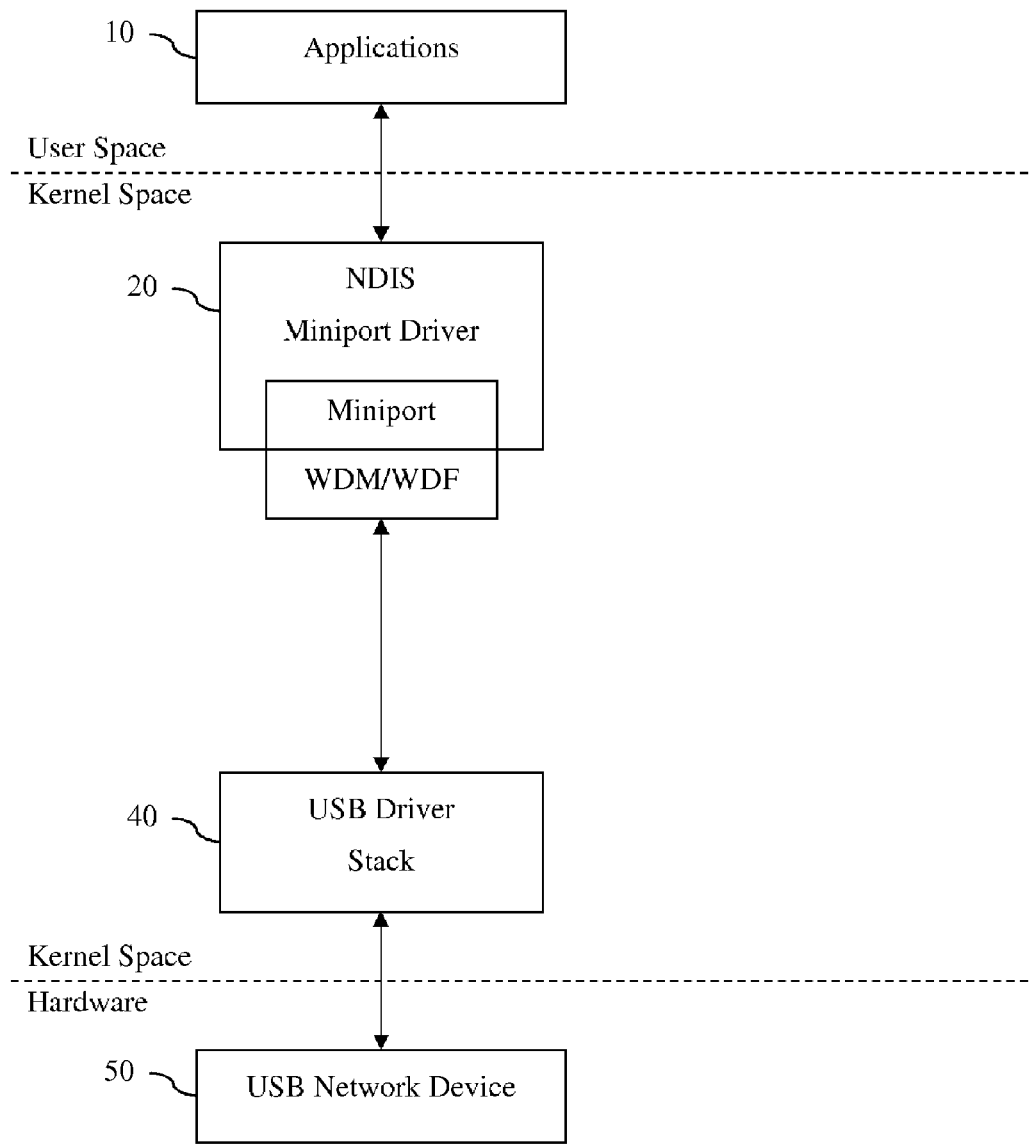
FIG. 1 is a schematic diagram of a conventional driver architecture.
Figure 2:
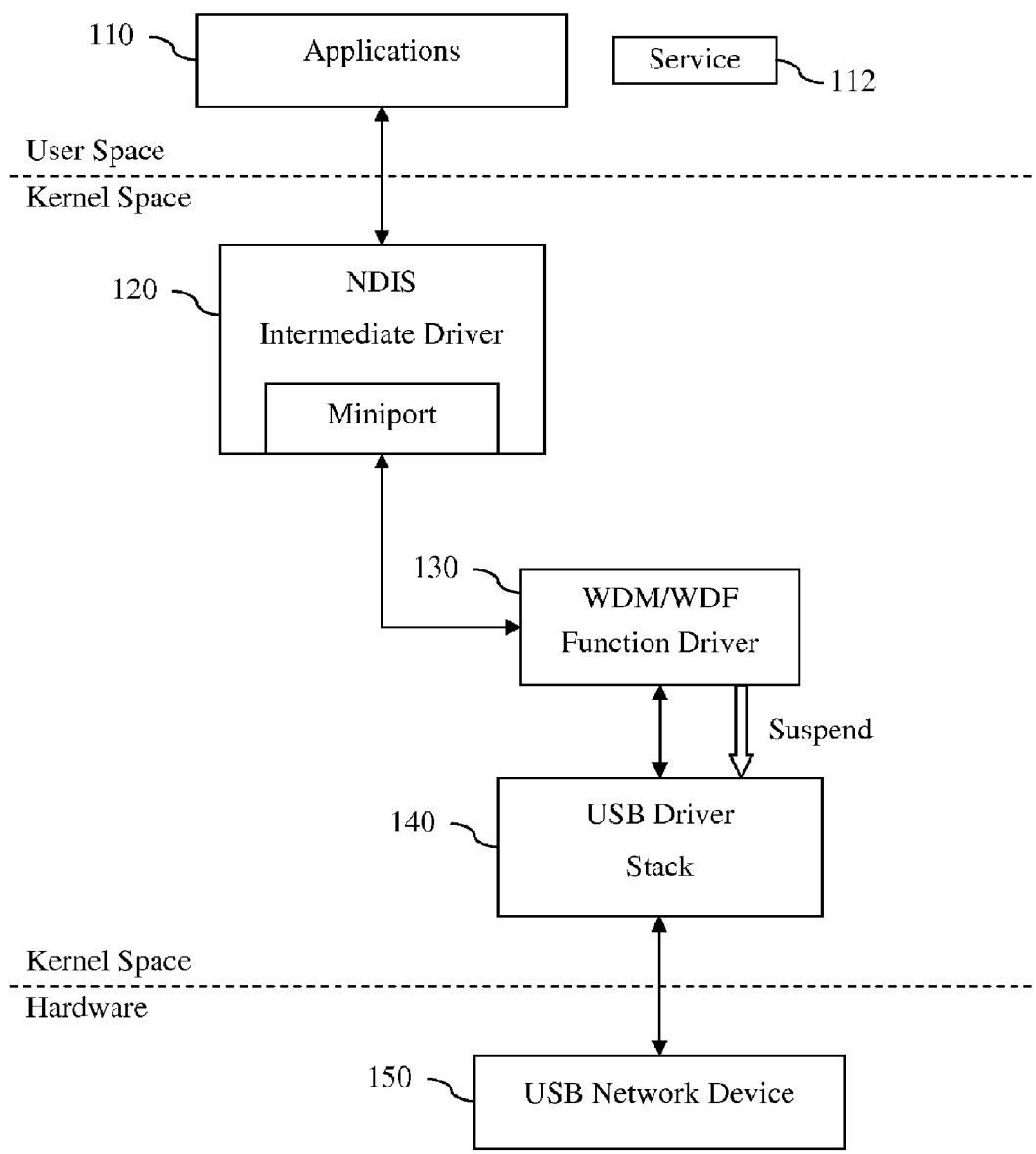
FIG. 2 is a schematic diagram of a dual-stack driver architecture according to an embodiment of the present invention, illustrating selective suspension of the USB network device.

Referring to FIG. 2, there is shown a schematic diagram of a dual-stack driver architecture according to one embodiment of the present invention, illustrating selective suspension of the USB network device. The present invention dual-stack driver architecture includes a user space with applications 110, and a kernel space with NDIS miniport driver 120, a WDM/WDF function driver 130 and USB driver stack 140, for interfacing with hardware USB network device 150.

This architecture is a dual-stack architecture in that there are two device drivers in different driver stacks working together to control an USB device and perform USB suspend operation. Here, the NDIS miniport driver 120 (which is the original driver) in the kernel space is an intermediate driver and a "virtual" device in a first driver stack that interacts with user applications in the user space, while the WDM/WDF driver 130 in the kernel space is a function driver in a second driver stack that interacts with a physical device (i.e. the USB network device 150). The virtual device 120 is created in a network stack, and monitored, by a user space process, while the WDM/WDF driver interacts with the physical device in the USB driver stack. For example, the WDM/WDF driver can forward USB transfer requests from the virtual device 120 in the first driver stack to the physical device in the second driver stack. Because the NDIS miniport driver 120 and the WDM/WDF driver 130 are in two different driver stacks, the OS restriction or limitation on the NDIS driver does not apply to the WDM/WDF driver 130, so as a function driver the WDMM/WDF driver 130 can issue a power IRP to selectively suspend the USB network device 150 through the USB driver stack 140.

Figure 3:
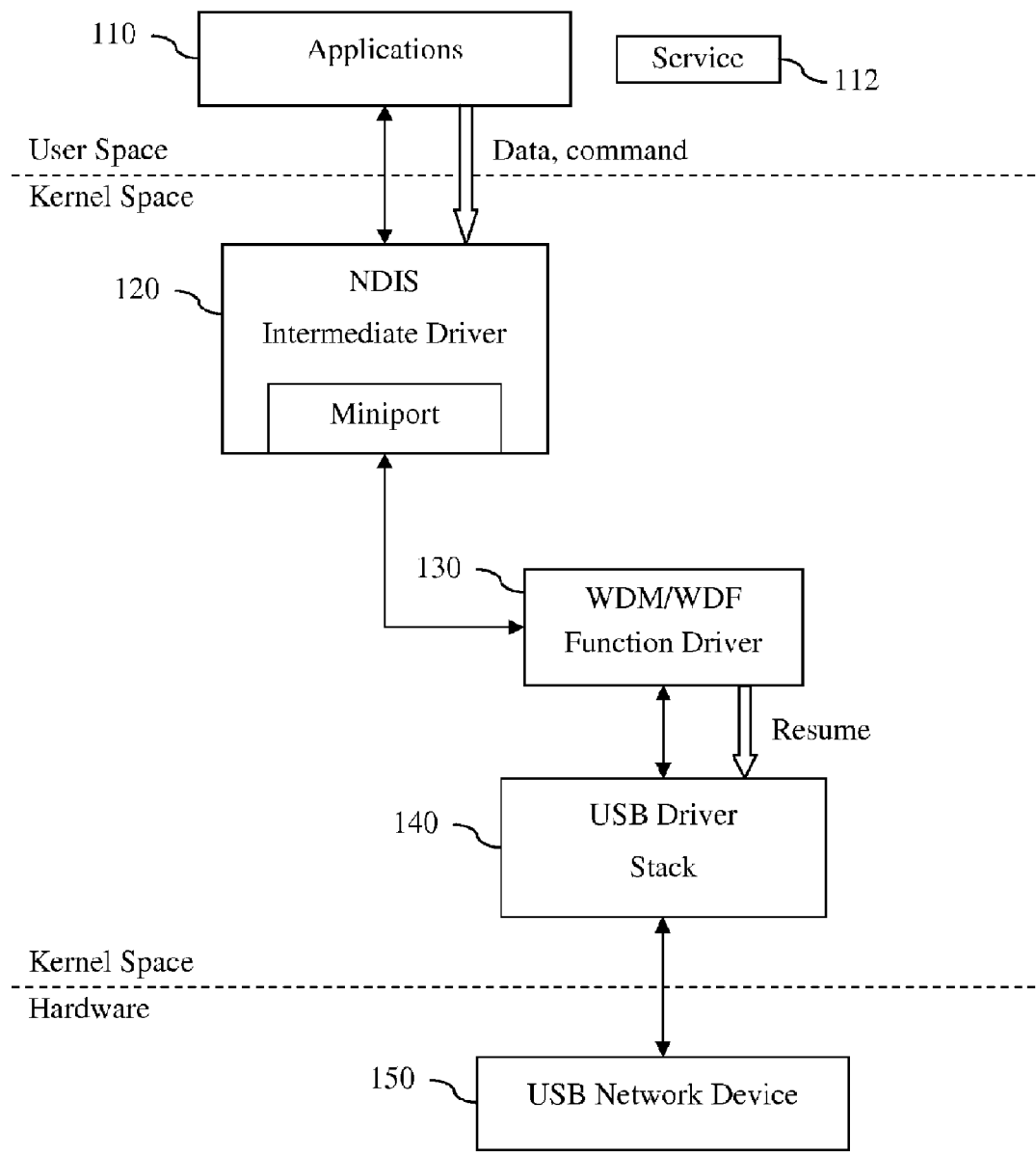
FIG. 3 is a schematic diagram of a dual-stack driver architecture according to an embodiment of the present invention, illustrating direct resuming of the USB network device.

Moreover, as shown in FIG. 3 of a "host resume" operation, the dual-stack architecture of the present invention also allows the USB network device 150 be directly accessible by the user applications 110. Because the WDM/WDF driver 130 is now in a different driver stack from the NDIS miniport driver 120, the OS restriction or limitation on the NDIS driver does not apply to the WDM/WDF driver 130. When the user application 110 is attempting to directly access the USB network device 150, the WDMM/WDF driver 130, as a function driver, can issue a power IRP to resume the USB network device 150 through the USB driver stack 140.

Figure 4:
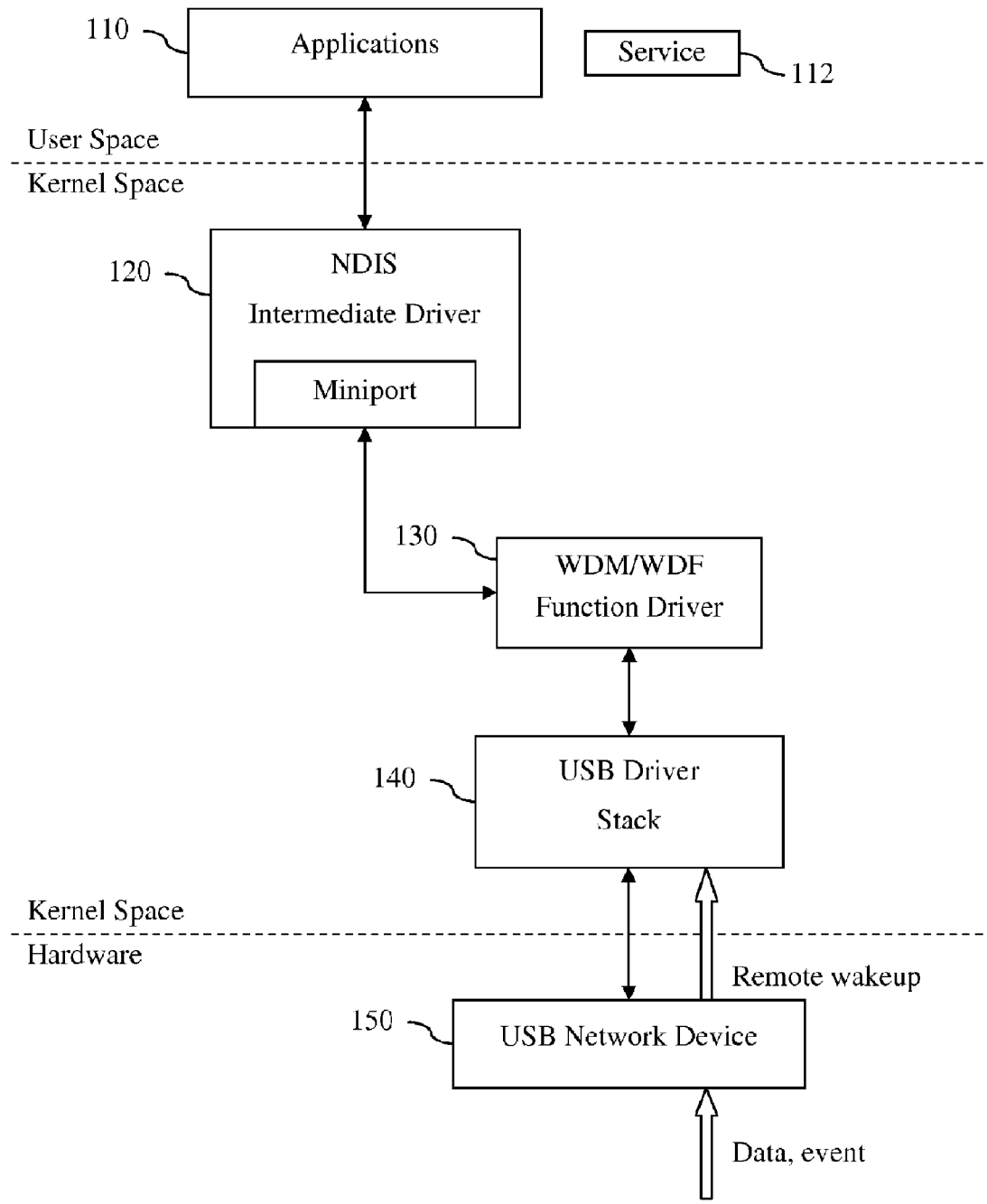
FIG. 4 is a schematic diagram of a dual-stack driver architecture according to an embodiment of the present invention, illustrating remote waking up of the USB network device.

Likewise, as shown in FIG. 4 of a "device resume" operation, the dual-stack architecture of the present invention allows the USB network device 150 be remotely waken-up when is a data or event coming from the network to the USB network device 150. From the network side the WDM/WDF is the function driver in the USB driver stack, and the NDIS miniport driver is a virtual intermediate driver. Since the NDIS driver 120 and the WDM/WDF driver 130 are in two different driver stacks, the OS restriction or limitation on the NDIS driver does not apply to the WDM/WDF driver 130, which as a function driver now can handle the remote wake up of the USB network device 150 through the USB driver stack.

Figure 5:
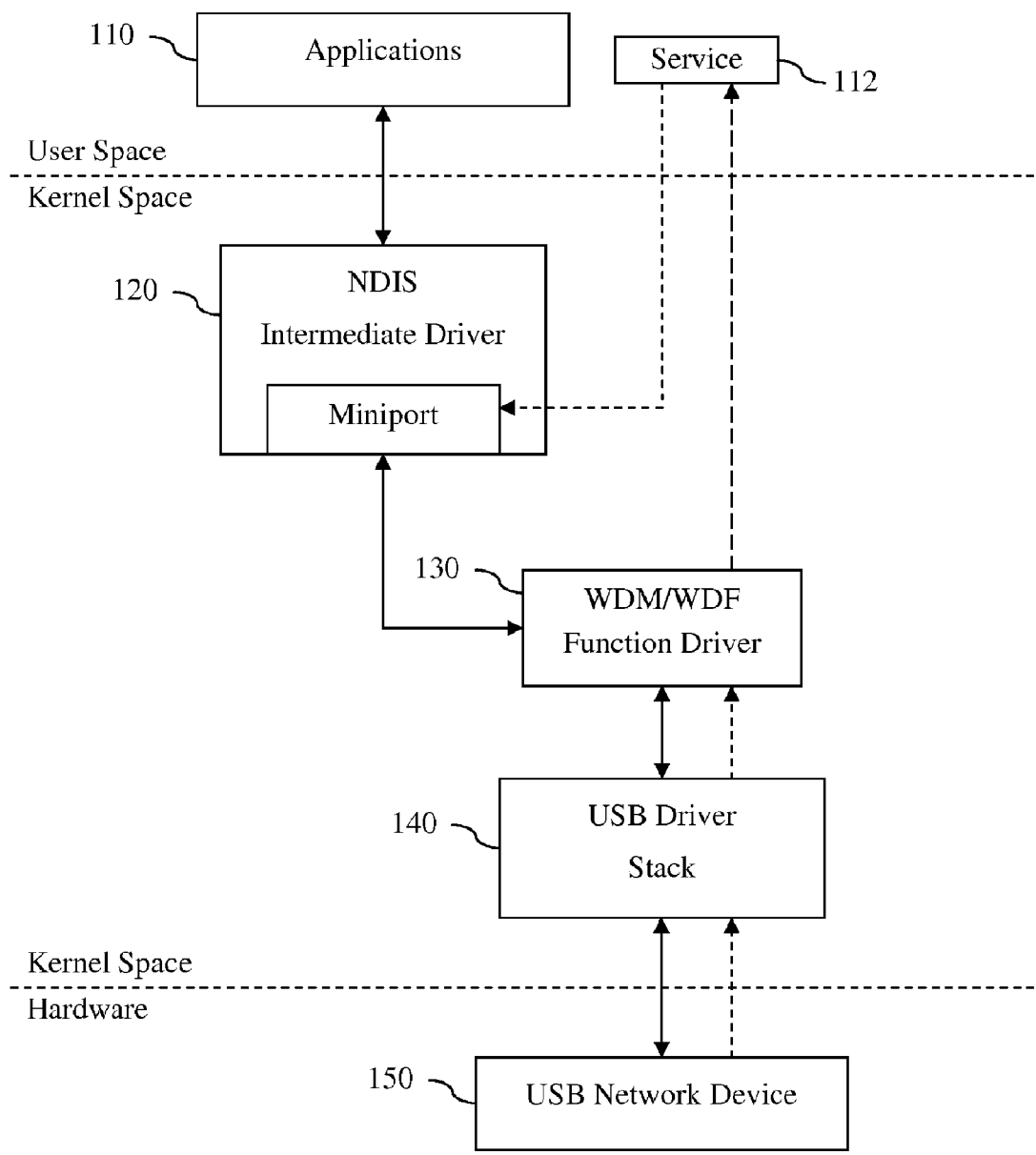
FIG. 5 is a schematic diagram of a dual-stack driver architecture according to an embodiment of the present invention, illustrating plugging in of an USB network device for the first time.

Referring to FIG. 5, there is shown the dual-stack driver architecture according to an embodiment of the present invention, illustrating plugging in of an USB network device for the first time. When the USB network device 150 is plugged in for the first time, the WDM/WDF driver 130 as the function driver in the USB driver stack will access the service software 112 in the user space, which will in turn cause the USB network device 150 be recognized by the NDIS miniport driver 120, so the user space applications may access the USB network device 150 through the NDIS miniport driver 120 as an intermediate driver. Alternatively, When the USB network device 150 is plugged in for the first time, the WDM/WDF driver 130 as the function driver in the USB driver stack will access the service software 112 in the user space, which in turn creates a virtual device in the first driver stack as the NDIS intermediate driver. The service program 112 may also monitor the virtual device in the first driver stack.

Figure 6:
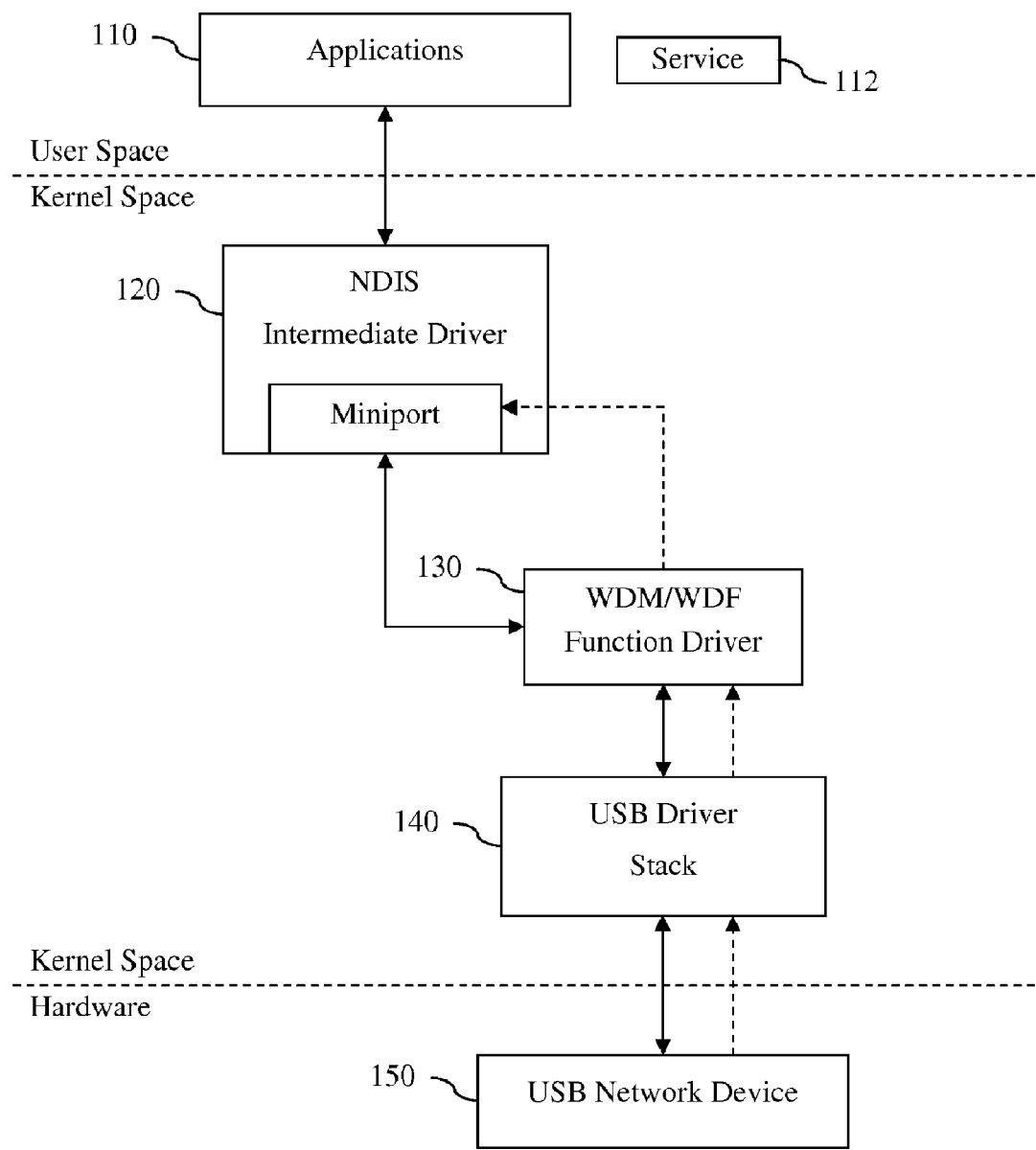
FIG. 6 is a schematic diagram of a dual-stack driver architecture according to an embodiment of the present invention, illustrating subsequent plugging in of the USB network device after the first time.

Referring to FIG. 6, there is shown the dual-stack driver architecture according to an embodiment of the present invention, illustrating the subsequent plugging in of an USB network device after the first time. When the USB network device 150 is subsequently plugged after the first time, since the NDIS miniport driver 120 already recognizes the USB network device 150 from the first time plug-in, the WDM/WDF driver 130 no longer need to access the service software 112 in the user space, but rather directly link the USB network device 150 to the NDIS miniport driver 120.

Figure 7:
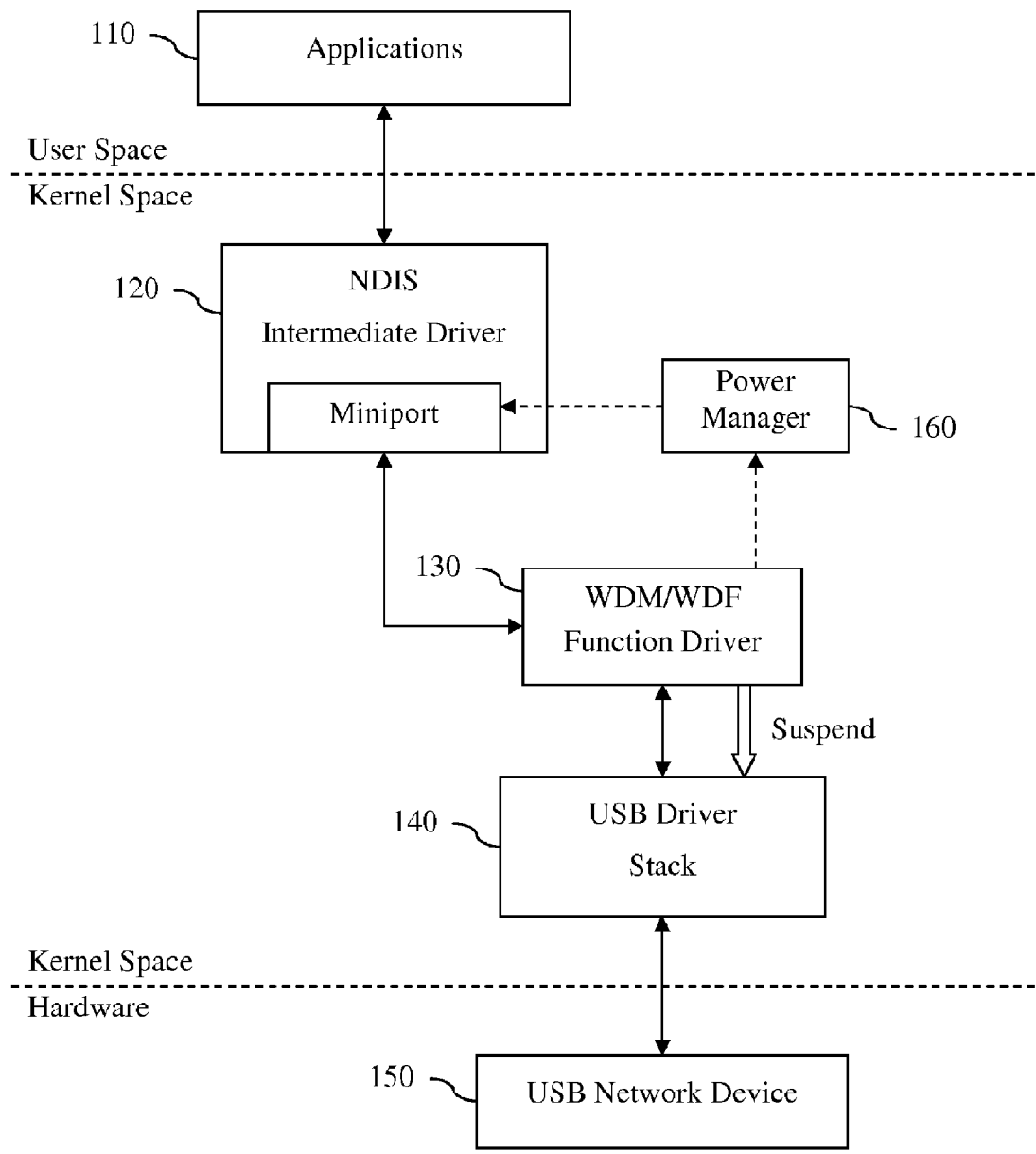
FIG. 7 is a schematic diagram of a dual-stack driver architecture according to an embodiment of the present invention, illustrating monitoring the status of the USB network device.

Referring to FIG. 7, there is shown the dual-stack driver architecture according to an embodiment of the present invention, illustrating monitoring the status of the USB network device 150. A power manager program 160 is provided in the kernel space for monitoring and synchronizing state changes of the USB network device 150 between the virtual and physical devices in the kernel space directly. It will notify the power state changes (e.g., suspended) of the USB network device 150 to the top of the driver stack. It can also synchronize the USB network device state changes between the virtual and physical devices in kernel space directly. If, for example, the USB network device 150 becomes disabled, the power manager 160 can send an IRP to the NDIS driver 120. After the NDIS driver 120 receives this power IRP, the USB network device 150 will become unavailable to the user application 110.

It should be noted that although USB network device is used as an example in the above descriptions, the present invention is not limited to USB network devices, and can be applied to other I/O devices, where the above-discussed restriction on selective suspension exists.

Figure 9:
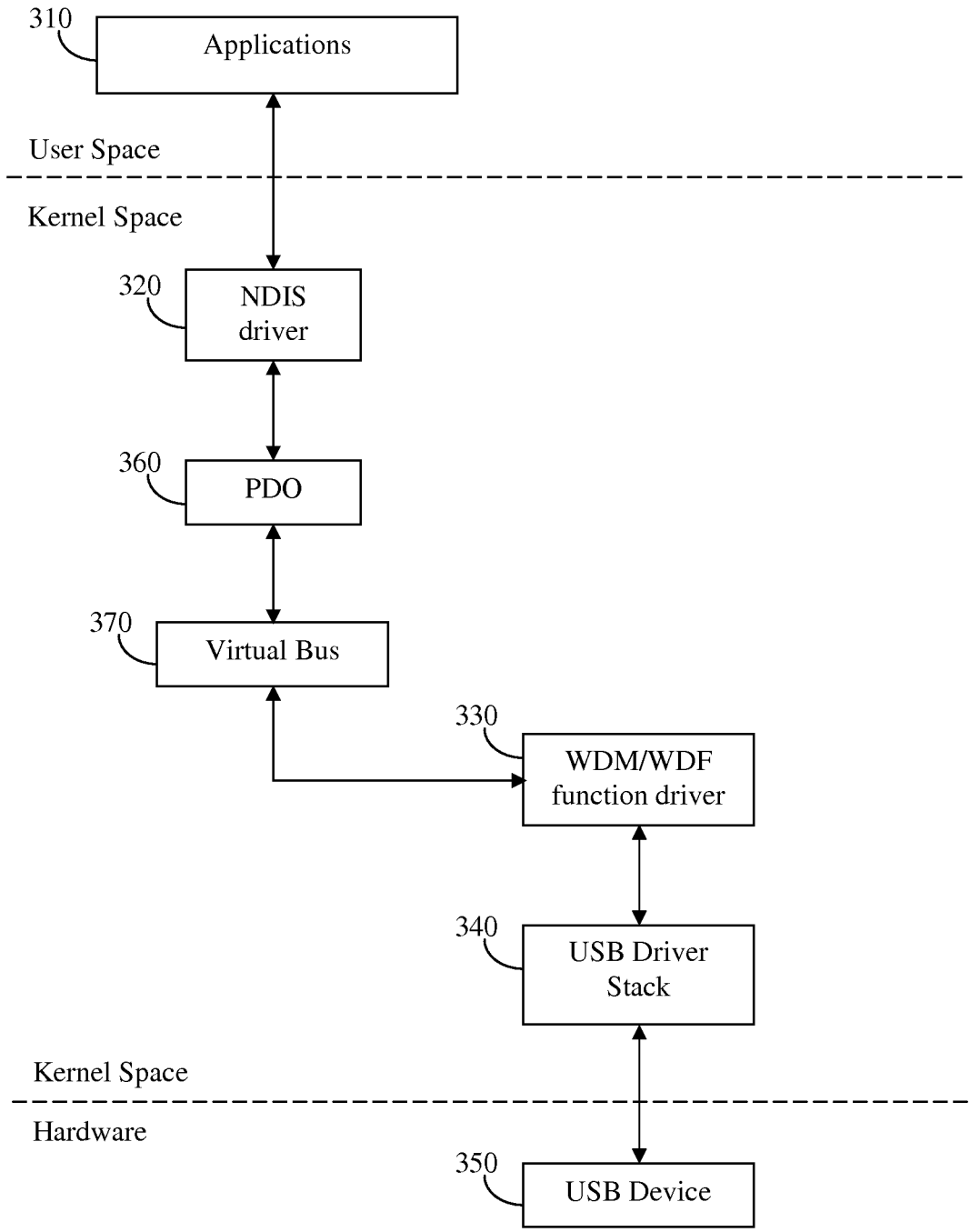
FIG. 9 is a schematic block diagram of a dual-stack driver architecture according to another embodiment of the present invention.

FIG. 9 schematically illustrates a dual-stack driver architecture according to another embodiment of the present invention. The dual-stack driver architecture includes applications 310 in the user space, and a USB driver stack 340, a WDM/WDF function driver 330, a virtual bus 370, a PDO (Physical Device Object) 360, and an NDIS driver 320 in the kernel space, coupled in the manner shown in FIG. 2, for interfacing with USB device hardware 350.

Similar to the architecture shown in FIG. 2, the architecture shown in FIG. 9 is a dual-stack architecture in that there are two function drivers in two different driver stacks working together to control an USB device and perform USB suspend operation. The first driver stack includes the virtual bus 370, the PDO 360, and the NDIS driver 320. The second driver stack includes the USB driver stack 340 (e.g. a generic USB driver) and the function driver 330. The USB driver stack 340 and the function driver 330 are similar to the USB driver stack 140 and function driver 130 in FIG. 2, although the interaction between the function driver 330 and the virtual bus 370 is different from the interaction between the functional driver 130 and the NDIS miniport driver 120. Similar to the embodiment of FIG. 2, in the first driver stack, the function driver 330 is the power policy owner and can issue power IRPs to selectively suspend the USB device 350 through the USB driver stack 340; the NDIS driver 320 is unaware of the selective suspend state of the USB device 350.

As compared to FIG. 2, in the first driver stack, the NDIS intermediate driver and miniport driver 120 of FIG. 2 is replaced by the virtual bus 370, PDO 360, and NDIS driver 320 in FIG. 9. The virtual bus 370 is a virtual device object and associated driver, and behaves like a bus according to relevant specifications. The virtual bus 370 is created by software before the USB device 350 is first plugged into the host computer. Each time the USB device 350 is plugged into the host computer (either the first time or subsequent times), the function driver 330 requests the virtual bus 370 to create a corresponding PDO 360. A PDO (Physical Device Object) is a type of WDM device object; it is a child of the bus and represents a device on a bus to a bus driver. The NDIS driver 320 (a virtual device object and associated driver) is then created and associated with the PDO 360. Note that in the embodiment shown in FIG. 2, box 120 is shown as a (miniport, port) pair. In FIG. 9, the NDIS driver 320 is shown generally as an NDIS driver; it may be a (miniport, port) pair but is not limited thereto.

By using a virtual bus 370, the driver above it in the first driver stack can be any one of many kinds of drivers, not limited to drivers for network devices (although an NDIS driver is shown here as an example). Other types of devices may include drivers for file transfer devices, mass storage devices, communication device (CDC/ACM, Communication Device Class/Abstract Control Model), mobile device through MTP (Media Transfer Protocol) and PTP (Picture Transfer Protocol), and etc. This architecture is therefore more versatile, and enables selective suspension of many types of devices. Moreover, multiple PDOs 360 can be created as children of the same virtual bus 370, each PDO having a driver associated with it, forming multiple first driver stacks. In other words, multiple first driver stacks can share the same virtual bus 370, and interacts with multiple corresponding multiple second driver stacks.

The virtual bus 370 in the first driver stack communicates with the function driver 330 in the second driver stack. For example, the virtual bus 370 forwards IRPs to the function driver 330.

The operations shown in FIGS. 2-4 (i.e., USB selective suspend, host resume, device resume) are performed in the embodiment of FIG. 9 in similar manners.

In the architecture shown in FIG. 2, a power manager 160 notifies power state changes of the USB device to the NDIS driver 120, as shown in FIG. 7. In the embodiment of FIG. 9, the power state change of the device 350 is notified to the virtual bus 370 through the function driver 330. Unlike in FIG. 7, in this embodiment, there is no power manager to handle this notification.

Figure 8:
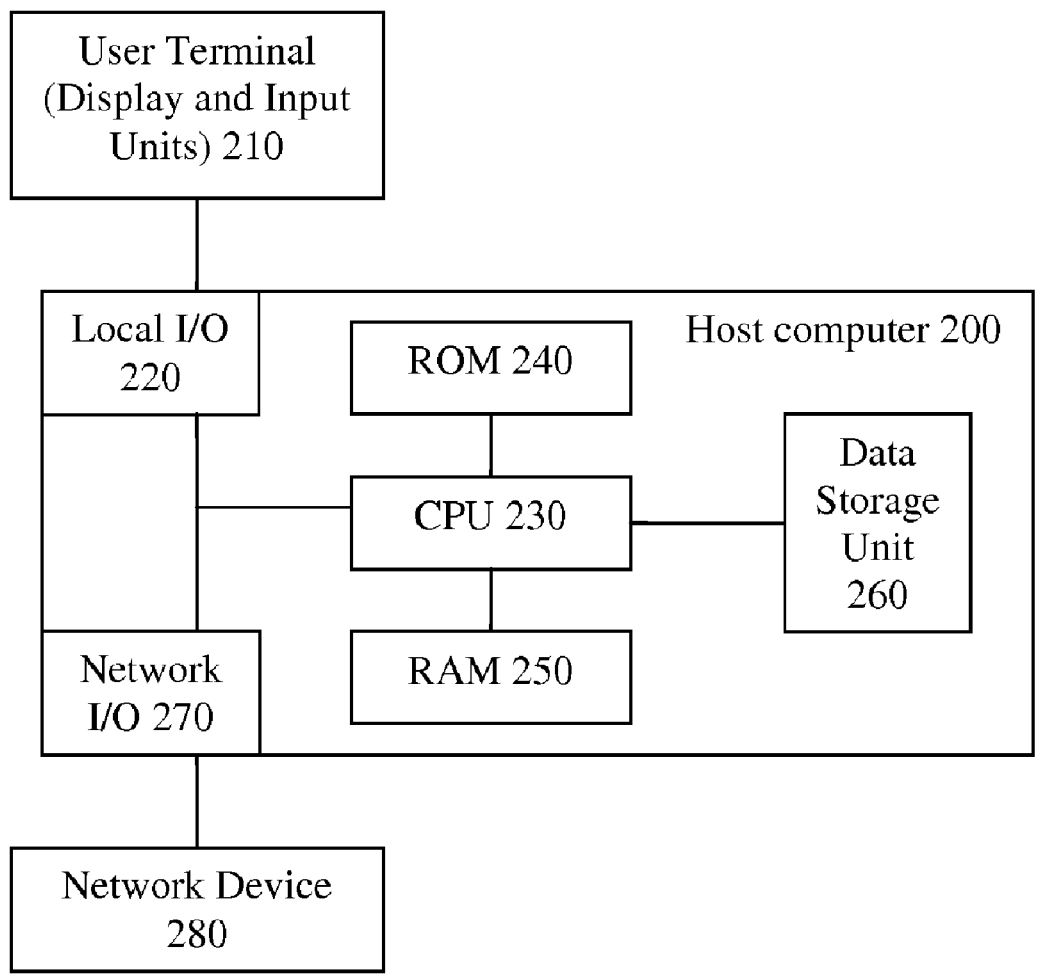
FIG. 8 is a schematic block diagram illustrating an exemplary computer system for implementing the present invention method.

Referring to FIG. 8, there is schematically shown an exemplary computer system for implementing the present invention method and program. The computer system includes a host computer. One or more user terminals 210 (each may have its display and input units) may be connected to the host computer 200 via, for example a local I/O port 220, to enable operators and/or users to interact with the host 200 and/or the rest of the computer system. Alternatively the host 200 may have its own integrated display and input units to enable operators and/or users to interact with the host and/or the rest of the computer system.

The host 200 typically includes a central processor unit (CPU) 230 that controls the function and operation of the host 200 and execute computer instructions and programs that may be installed or saved on a read only memory (ROM) 240, a random access memory (RAM) 250, or a data storage unit 260 (such as a hard disc drive) coupled to the CPU 230. The host 200 typically also has a network I/O port 270 for connection to one or more network devices 280. The host 200 is preferably also connected to a network, for example an open external network such as the Internet (not shown).

The computer software program, including the part for implementing the dual-stack driver architecture that exemplarily implementing the present invention method and process, may be installed on the memory or data storage unit of the host computer 200. When software program is executed by the CPU of the host computer, the host computer 200 carries out various functions of the program, including those of the dual-stack driver architecture described earlier that implementing the method of the prevent invention. The software program may also utilize useful features such as a user interface (UI) and/or a graphical user interface (GUI) of the host computer 200 such as a touch-screen and/or a mouse and a keyboard, coupled or combined with a display monitor.

It will be apparent to those skilled in the art that various modification and variations can be made in present invention method and related program without departing from the spirit or scope of the invention. Thus, it is intended that the present invention cover modifications and variations that come within the scope of the appended claims and their equivalents.

What is claimed is:

1. A method for controlling a device coupled to a host computer, comprising:
   providing a first driver stack in a kernel space of an operating system (OS) of the host computer, wherein the first driver stack comprises a virtual bus, a physical device object created by and coupled to the virtual bus, and a first device driver coupled to the physical device object, to interact with user applications in a user space of the OS; and
   providing a second driver stack in the kernel space of the OS, wherein the second driver stack comprises a function driver and a second device driver for the device, to interact with the device, wherein the function driver is coupled to the virtual bus of the first driver stack and the second device driver is coupled to the function driver,
   wherein the first driver stack forwards data between the user applications and the second driver stack, and the second driver stack forwards data between the first driver stack and the device,
   wherein the function driver issues a command to the second device driver to selectively suspend the device, and
   wherein the first driver stack and the second driver stack are distinct, and the first device driver and the function driver are distinct.

2. The method of claim 1, wherein when the device is in a suspend state, and in response to the first driver stack receiving a data or command from a user application, the function driver issues another command to the second device driver to resume the network device.

3. The method of claim 1, wherein when the device is in a suspend state, the function driver allows the device to resume.

4. The method of claim 1, further comprising providing a power manager in the kernel space for monitoring and synchronize changes of power state of the device and the virtual bus.

5. A computer software program product having a computer readable program code embedded in a computer usable non-transitory storage medium for controlling a host computer, the computer readable program code configured to cause the host computer to execute a process for controlling a device coupled to the host computer, the process comprising:
   providing a first driver stack in a kernel space of an operating system (OS) of the host computer, wherein the first driver stack comprises a virtual bus, a physical device object created by and coupled to the virtual bus, and a first device driver coupled to the physical device object, to interact with user applications in a user space of the OS; and
   providing a second driver stack in the kernel space of the OS, wherein the second driver stack comprises a function driver and a second device driver for the device, to interact with the device, wherein the function driver is coupled to the virtual bus of the first driver stack and the second device driver is coupled to the function driver,
   wherein the first driver stack forwards data between the user applications and the second driver stack, and the second driver stack forwards data between the first driver stack and the device,
   wherein the function driver issues a command to the second device driver to selectively suspend the device, and
   wherein the first driver stack and the second driver stack are distinct, and the first device driver and the function driver are distinct.

6. The computer software program product of claim 5, wherein when the device is in a suspend state, and in response to the first driver stack receiving a data or command from a user application, the function driver issues another command to the second device driver to resume the network device.

7. The computer software program product of claim 5, wherein when the device is in a suspend state, the function driver allows the device to resume.

8. The computer software program product of claim 5, wherein the process further comprises providing a power manager in the kernel space for monitoring and synchronize changes of power state of the device and the virtual bus.

* * * * *